United States Patent [19]
Golinkin et al.

[11] 3,880,812
[45] Apr. 29, 1975

[54] POLY(ALKYLENETRIMELLITATE IMIDES) AND METHOD OF PREPARATION

[75] Inventors: Herbert S. Golinkin; Robert G. Keske, both of Naperville, Ill.

[73] Assignee: Standard Oil Company, Chicago, Ill.

[22] Filed: Jan. 11, 1974

[21] Appl. No.: 432,569

[52] U.S. Cl...... 260/78.3 R; 117/123 D; 117/128.4; 117/132 B; 117/161 K; 117/161 UA; 260/33.4 P; 260/33.6 R; 260/75 N; 260/78 A; 260/78 L; 260/78 TF
[51] Int. Cl.............................................. C08g 20/32
[58] Field of Search.......... 260/78 TF, 75 N, 78.3 R

[56] References Cited
UNITED STATES PATENTS

| 3,060,191 | 10/1962 | Kolb et al. | 260/326 |
| 3,733,302 | 5/1973 | Klebe et al. | 260/47 |

*Primary Examiner*—Lester L. Lee
*Attorney, Agent, or Firm*—William H. Magidson; Arthur G. Gilkes; William T. McClain

[57] ABSTRACT

Poly(alkylenetrimellitate imides) having an inherent viscosity of at least 0.3 dl/g suitable for forming films, coatings and molded objects.

10 Claims, No Drawings

POLY(ALKYLENETRIMELLITATE IMIDES) AND METHOD OF PREPARATION

This invention relates to poly(alkylenetrimellitate imides) having an inherent viscosity of at least 0.3 dl/g. More particularly, this invention relates to poly(ethylenetrimellitate imides) having an inherent viscosity of at least 0.3 dl/g.

Commonly assigned U.S. Pat. No. 3,060,191 of Kolb et al., describes a series of N-hydroxyalkyl trimellitic acid imides and homopolymers thereof. In particular, this patent describes the uncatalyzed autoesterification of N-hydroxyethyl trimellitic acid imide to produce a relatively low molecular weight homopolymer melting at 200°C. Based on present studies we believe that this polymer has an inherent viscosity (I.V.) of about 0.15 dl/g. Self-supporting films cast from a solvent solution and from melts of this 0.15 dl/g I.V. homopolymer by us were unsatisfactory in the sense that they had low tensile strength and were very brittle. The solvent cast films had a white residue. The films were so brittle that they could not be tested on an Instron film tester. These polymers cannot be used to prepare self-supporting films or engineering plastics because of the poor physical properties. However, it is desirable to provide new polymers of this type having enhanced physical properties.

The general object of this invention is to provide poly(alkylenetrimellitate imides) having enhanced physical properties. A more specific object of this invention is to provide poly(ethylenetrimellitate imide) suitable for producing self-supporting films. Another object of this invention is to produce poly(ethylenetrimellitate imide) suitable for use as an engineering plastic, particularly for use in injection molding. Other objects appear hereinafter.

For the purposes of this invention, inherent viscosity is measured at 25°C and 0.5%w/v in 60/40 w/w phenol-/1,1,2,2-tetrachloroethane. The term "solid state polymerization" refers to chain extension of polymer particles under conditions where the polymer particles retain their solid form and do not become a fluid mass.

We have now found that poly(alkylenetrimellitate imides) having an I.V. of at least 0.3 dl/g can be cast into clear films from solvent or melt. In contrast to the lower I.V. polymers, films cast from the polymers of this invention are substantially clear, contain no opaque white residue and have excellent mechanical properties. For example, 0.5 to 2.0 mil poly(ethylenetrimellitate imide) films of this invention have a tensile strength of 6,500 to 10,000 psi, 2.5 to 4.5 percent elongation at break and 0.1 to 0.3 × $10^6$ psi elastic modulus. If the film is produced from a polymer having an I.V. less than 0.3 dl/g, the solvent cast film contains a white residue and both solvent and melt cast films have poor tensile properties. Best film properties with the polymers of this invention have been obtained with polymers having an I.V. of 0.7 to 1.0 dl/g.

The polymers of this invention can also be employed as engineering plastics. For example, when 0.3 dl/g poly(ethylenetrimellitate imide) is compression molded at 350° to 400°F at 2,000 to 10,000 psi, one-eight inch translucent colored sheets are produced having a Barcol hardness of 38, 3,000 to 4,500 psi tensile strength, 2 to 2.5 percent elongation at break, and 0.1 to 0.3 × $10^6$ psi elastic modulus. In general, the higher the I.V. the better the mechanical properties of the plastic.

Broadly speaking, the polymers of this invention can be produced by polymerizing N-hydroxyalkyl trimellitic acid imide in the presence of a suitable catalyst. Our studies have shown that in the absence of catalyst, the maximum I.V. of homopolymeric poly(ethylenetrimellitate imide) is about 0.15 dl/g. Further, just any catalyst cannot be used to obtain the required degree of polymerization. For example, when N-hydroxyethyl trimellitic acid imide was polymerized in the presence of 1% by weight (a) aluminum oxide, (b) boric acid, (c) boron oxide, (d) cobaltic oxide, (e) chromic oxide, (f) perchloric acid, (g) phosphoric acid and (h) sulfuric acid, polymers were obtained having I.V. of (a) 0.16, (b) 0.16, (c) 0.17, (d) 0.24, (e) 0.18, (f) 0.13, (g) 0.25 and (h) 0.11. None of these polymers was suitable for producing films. Accordingly, more than just trying a catalyst is involved in obtaining a poly(alkylenetrimellitate imide) suitable for producing films, coatings, and plastics.

Our studies have shown that the degree of polymerization attainable is a function of several interdependent factors. One molecule of water is produced as each N-hydroxyalkyl trimellitic acid imide monomer condenses with a poly(alkylenetrimellitate imide) chain and as each poly(alkylenetrimellitate imide) chain condenses with another chain. Other things being equal, as the average chain length of the polymer increases, the viscosity of the melt increases thereby making it more difficult to drive off water of condensation from the reaction. As the water concentration increases, the polyesterification slows down and eventually terminates. Accordingly, the maximum degree of polymerization attainable is primarily a function of the reaction temperature. However, the higher the reaction temperature the greater the tendency for the polymer to degrade. We have found that it is possible to raise the reaction temperature by employing suitable polymerization catalysts without substantial degradation of the polymer. The higher the temperature at which the reaction can be run without degradation of the polymer, the lower the viscosity of the melt at any given degree of polymerization, the more water that can be driven off and the higher the degree of polymerization attainable. Using the same equipment, present studies indicate that each reaction temperature has its own maximum level of degree of polymerization for the melt polymerization. However, higher degrees of polymerization may be obtained in equipment providing greater surface area thereby enabling removal of more water at a given viscosity.

The polymers of this invention can be produced by polymerizing one or more N-hydroxyalkyl trimellitic acid imides in the presence of a suitable catalyst. The N-hydroxyalkyl trimellitic acid imides can be prepared separately and charged to the polymerization apparatus. Preferably trimellitic anhydride and/or acid and one or more alkanol primary amines are reacted together to form N-hydroxyalkyl trimellitic acid imide in the manner described in U.S. Pat. No. 3,060,191, which is incorporated by reference, and the resultant reaction product polymerized.

Suitable N-hydroxyalkyl trimellitic acid imides useful in this invention include N-hydroxyethyl trimellitic acid imide, N-hydroxypropyl trimellitic acid imide, N-hydroxybutyl trimellitic acid imide, N-hydroxyhexyl trimellitic acid imide, N-hydroxyoctyl trimellitic acid imide, etc. These monomers can be homopolymerized or two or more monomers copolymerized. If desired the N-hydroxyalkyl trimellitic acid imide can be copolymerized with up to 25 mol percent of one or more comonomers capable of reacting as if it had both terminal acyl functionality and -XH functionality wherein X stands for -O- or

. Suitable comonomers of this type include amino acids, such as aminoacetic acid, aminohexanoic acid, aminobenzoic acid, etc.; lactams, such as caprolactam, etc.; lactones, such as beta-propiolactone, caprolactone, etc.; hydroxycarboxylic acids such as salicylic acid, glycollic acid, etc.; half-esters of dicarboxylic acids and glycols, such as the half-ester of ethylene glycol and maleic anhydride, etc.

N-hydroxyethyl trimellitic acid imide is the preferred imide for use in this invention and preferably comprises at least 90 mol percent of the mer units in the polymer. Typical homopolymers of N-hdyroxyethyl trimellitic acid imide having an inherent viscosity of at least 0.4 dl/g have a heat deflection temperature of about 260°–310°F. (measured by ASTM D648-56 at 264 psi). In general the higher the heat deflection temperature of the thermoplastic polymer the better its performance in injection molding, i.e. the faster the mold cycle time. Homopolymers of higher N-hydroxyalkyl trimellitic acid imides have markedly lower heat deflection temperatures. Even copolymers of 80 to 90 mol percent N-hydroxyethyl trimellitic acid imide with correspondingly 20 to 10 mol percent of a higher N-hydroxyalkyl trimellitic acid imide (e.g. N-hydroxypropyl trimellitic acid imide or N-hydroxyhexyl trimellitic acid imide) have a 20° to 40°F. lower heat deflection temperature than the preferred hompolymers.

The catalysts useful in this invention include antimony trioxide, antimony tributoxide, tetrabutyl titanate, tetraisopropyl titanate, stannous salts, such as stannous laurate and various organotin compounds, such as dibutyltin maleate, dibulytindilaurate dibutyltin diacetate, tributyltin adipate, dibutyltin salicylate, dibutyltin dichloride, etc. Of these, the organotin salts and stannous salts of mono and dicarboxylic acids are the most versatile. For example, the antimony catalysts are not very effective in solid state polymerization, while the tin and titanate catalysts can be used advantageously in both states. The tin catalysts have the advantage over the titanate catalysts in that it is possible to produce polymers having an I.V. of up to about 0.7 dl/g in a single stage melt polymerization whereas the maximum I.V. attainable with titanate catalysts is about 0.4 dl/g in a single stage melt polymerization. The higher I.V. attainable with the tin compounds is due to the fact that higher esterification temperatures can be employed without substantial polymer degradation. We believe that this is due to the tin compounds acting as stabilizers and/or having catalytic activity at higher temperatures. For example, the optimum melt polymerization temperature for the titanate catalysts is about 235° to 285°C. (preferably 244° to 265°C.) and for the tin catalysts 235 to 315°C. (preferably 265 to 295°C). The lower temperatures yield products having the least color while the higher temperatures yield higher molecular weight polymers and/or faster reactions. The tin catalysts also permit the attainment of a second stage I.V. of 1.5 in about one-half to one-fourth the time that it takes to reach a second stage I.V. of 1.5 with the titanate catalysts. All of these catalysts can be used in a concentration of 0.01 to 2 parts by weight (preferably 0.1 to 0.5 parts by weight) per 100 parts by weight N-hydroxyalkyl trimellitic acid imide.

The N-hydroxyalkyl trimellitic acid imide can be polymerized in a one or two stage process. In either case, the N-hydroxyalkyl trimellitic acid imide is polymerized in a melt at a temperature of 225° to 340°C. In the two stage process, the solidified first stage polymer is ground or pelletized and then polymerized further at a temperature of 200° to 275°C. while maintaining the polymer in a solid state. Other things being equal, the two stage process permits the production of polymers having a higher I.V. than that obtainable in a one stage process. The higher molecular weight is attainable since, the larger surface area in the second stage polymerization facilitates removal of water.

In the preferred method of producing polymers of this invention starting with alkanol amine and trimellitic acid compound, the trimellitic acid compound, preferably anhydride, is dissolved or dispersed in a suitable solvent (such as dimethyl formamide) or diluent (such as water) and one mole of alkanol amine is added per mol of trimellitic acid compound. After all the alkanol amine is added, the solvent or diluent is removed, usually under vacuum. The polyesterification catalyst can be added at the same time as the alkanol amine or, if desired, after the solvent is removed. The N-hydroxyalkyl trimellitic acid imide and/or the partially condensed reactants are melt polymerized at a temperature of 200° to 315°C, preferably under vacuum. The melt polymerization is continued until the polymerization reaches an equilibrium, usually about 1 to 6 hours. The maximum first stage I.V. of (a) uncatalyzed reactions is about 0.15, (b) of titanate catalyst is about 0.4 (c) of tin catalyst about 0.7 and (d) antimony catalyst about 0.8. In general the higher the I.V. of the polymer in the first stage, the higher the polymer melting point and the easier it is to maintain the polymer in the solid state during the second stage polymerization.

Although the first stage, melt polymerization products having an I.V. of at least 0.3 dl/g can be used to produce free films, coatings, hot melt adhesives and plastics, it is generally preferred to employ a second stage polymerization to increase the polymer molecular weight for most uses. For example, films produced from polymers having an I.V. of 0.7 to 1.0 have much better double fold flexibility than polymers having an I.V. of 0.3 to 0.4. For injection molding, it is generally preferable to start with a polymer having an I.V. of at least 0.8 and the higher the I.V. the better in order to end up with a formed product having an I.V. of at least 0.4 since these polymers tend to hydrolyze somewhat during injection molding. Often the I.V. is halved.

The solid state polymerization, which is carried out below the melting point of the polymer, can be conducted in several ways. However, all of the techniques require heating the ground or pelletized polymer below the polymer melting point, generally 200° to 275°C. while either sparging with an inert gas, such as nitrogen or air, or operating under a vacuum. As indicated above, these conditions facilitate the removal of water from the polymer and thereby enhance polymer chain growth.

The polymers of this invention and particularly the poly(ethylene-trimellitate imide) can be used as self-supporting films, coatings for various substrates such as metals, ceramics, etc., engineering plastics or hot melt adhesives. As indicated above, the self-supporting films of 0.5 to 2.0 mils prepared from 0.3 dl/g homopolymeric poly(ethylenetrimellitate imide) have a tensile strength of 6,500 to 10,000 psi, 2.5 to 4.5 percent elongation at break and 0.1 to 0.3 × $10^6$ psi elastic modulus. The endurance of the films to 135° double folding increases from 155 for an 0.3 dl/g film to 2,000 to 5,000 for an 0.7 to 1.0 dl/g film. Coatings on copper panels have withstood 80″ pounds reverse impact. Coatings on coils of magnet wire can fused advantageously by heating the coil to form a unitary structure. Fabricated plastics from this polymer are self-extinguishing, i.e., they do not support combustion on removal of a flame.

While these amorphous polmers soften over the range of about 225°C. to 265°C or higher they can be converted into crystalline solids by annealing. For example, annealed hompolymeric poly(ethylenetrimellitate imide) having an 0.3 dl/g inherent viscosity melts at about 263°C.

The following examples are merely illustrative. Mesh size was measured using U.S. Standard Sieve Series ASTM E11.

EXAMPLE 1

A four neck, three liter flask, equipped with a mechanical, variable speed stirrer, thermometer, nitrogen inlet tube and liquid addition funnel was charged with 442.3g (2.302 moles) trimellitic anhydride and 300 ml N,N-dimethylformamide. After the mixture was heated with stirring to moles) C., 140.6g (2.302 moles0 monoethanolamine was added via the addition funnel over a 5 min. period during which there was an exotherm and refluxing commenced. The addition funnel was rinsed with 10 ml dimethyl formamide which was added to the reaction mixture. A vacuum was applied and the dimethyl formamide distilled off as the temperature was raised. At 270°C. the vacuum was released and 0.525 ml tetra-n-butyl titanate in 1.5 ml n-butanol was added. The vacuum was reapplied and the temperature of 270°C. was maintained for 4 hours as the pressure was reduced to 0.3 mm Hg. The resulting glassy polymer had an inherent viscosity of 0.40 dl/g (0.5% w/v, 60:40 w/w phenol: tetrachloroethane, 25°C.), glass transition temperature of 155°C., decomposition temperature in air of 370°C. and softened over the range of 236° to 265°c.

An 18% by weight solution of the polymer in metacresol having a 9.8 Gardner-Stokes viscosity was cast on a glass plate using a number 3 wire wrapped rod and the solvent removed at 100°C. under vacuum. The dried film was removed from the glass by soaking in warm water and dried. The infra-red spectrum of the 0.0003 inch thick colorless film had the following characteristics:

| Absorption Bands | Identification (1) |
|---|---|
| 1778 $cm^{-1}$ | imide ring C = O sym. stretch |
| 1711 (doublet) | imide ring C = O asym. stretch ester C = O stretch |
| 1376 | imide ring C-N stretch |
| 1270 | Ar-C(=O)-O-$CH_2$-stretch |
| 727 | imide ring |

The absence of amide absorption at 1710, 1630, 1580 and 1475 $cm^{-1}$ demonstrated the absence of N-mono-substituted amide groups in the polymer.

An 0.001 in. or 1 mil film prepared in essentially the same manner had tensile strength of 6,500 to 10,000 psi, elongation at break of 2.5 to 4.5% and an elastic modulus of 0.1 to 0.3 × $10^6$ psi.

EXAMPLE II

This example illustrates a two stage polymerization of N-hydroxyethyltrimellitic acid imide. Four hundred forty-two pounds trimellitic anhydride, 142 pounds ethanolamine containing 1 pound tetra-n-butyl titanate, 0.5 pounds butylated hydroxytoluene stabilizer and 8 gallons of water were stirred in a 200 gallon reactor equipped with condenser, addition funnel, vacuum trap and three stage steam ejector and then heated to 525°F. When the pressure in the kettle reached 90 psi, distillation of water was allowed to proceed and approximately 140 lbs. of distillate was collected over a one hour period, during which the pressure was slowly dropped to atmospheric. A vacuum was then drawn on the system and the polymer melt was stirred two hours at 475°–480°F. and 3-5 mm Hg. The reactor was then pressurized with 20 psig of $N_2$ and approximately 500 lbs. of polymer was drained from the kettle. The polymer had an inherent viscosity of 0.21 (0.5 percent, 60:40 phenol:tetrachloroethane, 25°C).

Part of the polymer was ground on a Thomas-Wiley mill using a 2 mm screen opening. The resulting polymer had an approximate particle size distribution of 15–20 mesh (50%), 20-40 mesh (35%), and > 40 mesh (15%). This polymer had an inherent viscosity of 0.21 dl/g (0.5%, 60:40 phenol:tetrachloroethane, 25°C.). Five hundred grams of polymer were placed in a one liter R.B. flask with the finest (>40 mesh) on the bottom and the coarsest material (15-20 mesh) on top. The flask was immersed in an oil bath whose temperature was 210°C., and a vacuum (0.5 mm Hg) was drawn on the system. The temperature of the oil bath was slowly increased over 4 hours to 245°C. After an additional 11 hrs. at this temperature, the flask and polymer were cooled. The polymer had completely stuck together and was also partially stuck to the flask. The flask was broken and the chunk (granular, sugar-cube appearance) of polymer removed. Portions of polymer were broken off and inherent viscosities run: $n_{inh}$ = 1.05 dl/g for the bottom, $n_{inh}$ = 0.80 dl/g for the outside top (solvent system 0.5% in 60:40 phenol:tetrachloroethane at 25°C.).

EXAMPLE III

This example illustrates the use of talc as an anti-stick agent in the solid state polymerization of part of the ground first stage polymer of Example II. One thousand eight hundred grams of polymer (15–20 mesh) were thoroughly mixed with 36g of Talc and placed in a 4″ I.D. pyrex tube having a porous plate bottom. The apparatus was placed in an oven and 6.0 l/min. of $N_2$ (warmed in a heat exchanger consisting of 25′ of ¼″ coiled copper tubing in the oven) was passed through the tube from the bottom while the oven was heating according to the following schedule:

| Time | Temp. |
|---|---|
| 0 | Ambient |
| 1 hour | 177°C. |
| 2 hours | 185°C. |
| 3 hours | 194°C. |
| 4 hours | 204°C. |
| 5 hours | 222°C. |
| 6 hours | 234°C. |
| 7 hours | 245°C. |
| 23 hours | 251°C. |

The cooled polymer crumbled easily and had an I.V. of 1.07 dl/g.

EXAMPLE IV

This example illustrates the use of dibutyltin maleate as the polymerization catalyst. 332 pounds trimellitic anhydride, 106 pounds ethanolamine and 5 gallons water were stirred in a 200 gallon reactor equipped with condenser, addition funnel, vacuum trap and three stage steam ejector. Reactor temperature was then raised to 445°F. When the pressure in the kettle reached 55 psi, distillation of water was allowed to proceed with the result that the pressure was increased to 80 psi and the jacket temperature was increased to 520°F. After the pressure was slowly dropped to atmospheric and the temperature of the reactants reached 445°F., 1.5 pounds dibutyltin maleate was added. A vacuum was then drawn on the system. The therminol temperature was slowly lowered so that after 30 minutes the polymer temperature was 486°F at 3.2 mm pressure. After 1 ¼ hours the polymer temperature was 534°F at 0.8 mm Hg. The reactor was then pressurized with 50 psig of $N_2$ and the polymer was drained from the kettle. The polymer had an inherent viscosity of 0.44 (0.5%, 60:40 phenol:tetrachloroethane, 25°C).

One thousand grams of the polymer, ground to 15 to 40 mesh, was mixed with 10 grams talc and placed in a 5 gallon can mounted on a stainless steel shaft. The can was placed in an oven and the shaft turned at 25 RPM while $N_2$ was passed through the can at 10 l/min. and the oven was heated according to the following schedule:

| Time | Temp. |
|---|---|
| 0 | Ambient |
| ½ hour | 375°F. |
| ¾ hour | 400°F. |
| 1 hour | 425°F. |
| 1¼ hours | 450°F. |
| 1 ½ hours | 475°F. |
| 6½ hours | 475°F. (turned off) |

The granular polymer had an I.V. of 1.01.

EXAMPLE V

This example illustrates the production of 0.64 I.V. polymer in a single stage reaction. 884.6 grams trimellitic anhydride, 4.0 grams dibutyltin maleate, 120 ml water and 283.2 grams ethanolamine in a three neck flask were heated to 580°F with stirring. After the distillation of some water the mixture solidified. Heating was continued until the solid had completely melted, the mantle temperature was raised to 620°F and a vacuum was drawn on the system. After stirring for 1 hr. under vacuum, the polymer was cooled and ground to give material with an inherent viscosity of 0.64 (0.5%, 60.40 phenol:tetrachloroethane, 25°C.).

Essentially the same results can be obtained replacing dibutyltin maleate with dibutyltin acetate, tributyltin adipate, dibutyltin salicylate and stannous laurate. However, if dibutyltin maleate is replaced with dibutyltin dichloride there is somewhat more degradation of the polymer.

EXAMPLE VI

This example illustrates injection molding of a homopolymeric poly(ethylenetrimellitate imide). Homopolymeric poly(ethylenetrimellitate imide) of Example III having an inherent viscosity of 1.07 dl/g was injection molded on a Van Dorn Model No. 50-RS-3 equipped with several molds including a ⅛ × ½ × 5 inches Bar mold with a 140°F. mold temperature, 100°F. throat temperature, cylinder temperatures of 470°F. rear and 520°F front, screw at 60 RPM, 2100 psi injection pressure, feed setting 1 ⅞inch, cushion ⅛inch, back pressure 100 psi and ram speed 10. The molded bars had 16,100 psi tensile strength, 563,000 psi tensile modulus, 4.7 percent elongation, 25,600 psi flexural strength, 573,000 psi flexural modulus, 275°F. heat deflection temperature and 0.56 dl/g inherent viscosity. We claim:

1. Poly(alkylenetrimellitate imide) having an I.V. of at least 0.3 dl/g at 25°C and 0.5%w/v 60/40 w/w phenol/-1,1,2,2-tetrachloroethane.

2. The poly(alkylenetrimellitate imide) of claim 1, wherein said alkylene group comprises ethylene.

3. The poly(alkylenetrimellitate imide) of claim 2, wherein the polymer is a homopolymer.

4. The poly(alkylenetrimellitate imide) of claim 2, wherein the polymer is in the form of a self-supporting film.

5. The poly(alkylenetrimellitate imide) of claim 3, wherein the polymer is in the form of a self-supporting film having an I.V. of at least 0.7 dl/g.

6. The poly(alkylenetrimellitate imide) of claim 2, wherein the polymer is in the form of a coating on a substrate.

7. The poly(alkylenetrimellitate imide) of claim 2, wherein the polymer is in the form of a molded object.

8. The method of producing the polymer of claim 1 having an I.V. of at least 0.3 dl/g which comprises melt polymerizing an N-hydroxyalkyltrimellitic acid imide under melt polymerization conditions in the presence of a tin catalyst.

9. The method of producing the polymer of claim 1 having an I.V. of at least 0.3 dl/g which comprises the steps of (1) melt polymerizing an N-hydroxyalkyltrimellitic acid imide under melt polymerization conditions, and (2) further polymerizing the polymer produced in step 1 while maintaining the polymer in a solid state.

10. The method of producing the polymer of claim 1 having an I.V. of at least 0.3 dl per gram which comprises melt polymerizing and N-hydroxyalkyltrimetllitic acid imide under melt polymerization conditions in the presence of an antimony catalyst.

* * * * *

UNITED STATES PATENT OFFICE
CERTIFICATE OF CORRECTION

PATENT NO. : 3,880,812
DATED : April 29, 1975
INVENTOR(S) : Herbert S. Golinkin and Robert G. Keske It is certified that error appears in the above-identified patent and that said Letters Patent are hereby corrected as shown below:

Column 3, line 44 - is "dibulytindilaurate dibutyltin"
should be --dibutyltin dilaurate, dibutyltin--

Column 5, line 14 - is "can fused" should be --can be fused--

Column 5, line 34 - is "stirring to moles) should be --stirring to 150°--

Column 5, line 34 - is (2.302 moles0 mono" should be --(2.302 moles) mono-

Signed and Sealed this first Day of June 1976

[SEAL]

Attest:

RUTH C. MASON
Attesting Officer

C. MARSHALL DANN
Commissioner of Patents and Trademarks